US011515755B2

(12) United States Patent
Krais et al.

(10) Patent No.: US 11,515,755 B2
(45) Date of Patent: Nov. 29, 2022

(54) STATOR HOUSING FOR AN ELECTRIC MACHINE, ELECTRIC MACHINE FOR A VEHICLE AND VEHICLE

(71) Applicant: VALEO SIEMENS EAUTOMOTIVE GERMANY GMBH, Erlangen (DE)

(72) Inventors: Nils Krais, Strahlungen (DE); Philipp Söntgerath, Niederkrüchten (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 164 days.

(21) Appl. No.: 16/692,094

(22) Filed: Nov. 22, 2019

(65) Prior Publication Data
US 2020/0177055 A1    Jun. 4, 2020

(30) Foreign Application Priority Data

Nov. 29, 2018  (EP) .................................... 18209098

(51) Int. Cl.
*H02K 9/19*    (2006.01)
*H02K 5/20*    (2006.01)

(52) U.S. Cl.
CPC ............... *H02K 9/19* (2013.01); *H02K 5/203* (2021.01)

(58) Field of Classification Search
CPC .. H02K 5/20; H02K 5/02; H02K 5/04; H02K 5/08; H02K 9/16; H02K 9/19; H02K 9/18; H02K 9/197; H02K 9/20; H02K 9/06
USPC ...... 310/52, 54, 58, 59, 12.29, 12.01, 89, 64
See application file for complete search history.

(56) References Cited

U.S. PATENT DOCUMENTS

| 8,973,363 | B2* | 3/2015 | Rohwer ................ H02K 9/19 60/714 |
| 2003/0222519 | A1 | 12/2003 | Bostwick |
| 2011/0221286 | A1* | 9/2011 | Uchiyama ............. H02K 1/20 310/54 |
| 2011/0234029 | A1 | 9/2011 | Pal |
| 2012/0091837 | A1 | 4/2012 | Bodenstein et al. |
| 2013/0234545 | A1 | 9/2013 | Pal |
| 2015/0308456 | A1* | 10/2015 | Thompson .......... F04D 29/5806 417/244 |
| 2016/0190878 | A1* | 6/2016 | Saari ..................... H02K 9/04 310/59 |

FOREIGN PATENT DOCUMENTS

| DE | 10 2012 022451 A1 | 5/2014 |
| DE | 102016225521 A1 | 6/2018 |
| EP | 2 369 723 A2 | 9/2011 |
| JP | 2007-143247 A | 6/2007 |
| KR | 2017 0011865 A | 2/2017 |
| TW | I 624 137 B | 5/2018 |
| WO | 03/100946 A1 | 12/2003 |

(Continued)

OTHER PUBLICATIONS

European Application Search Report dated Apr. 30, 2019.

*Primary Examiner* — Bryan R Perez
(74) *Attorney, Agent, or Firm* — Manabu Kanesaka

(57) ABSTRACT

Stator housing for an electric machine, includes a plurality of axially extending main channels, wherein pairs of adjacent main channels are connected by deflection channels to form a meandering cooling path for a coolant, and a plurality of connection channels that connect each pair of adjacent main channels in a fluid conductive manner at an axial position between the deflection channels.

15 Claims, 5 Drawing Sheets

(56) References Cited

FOREIGN PATENT DOCUMENTS

Figure 1:
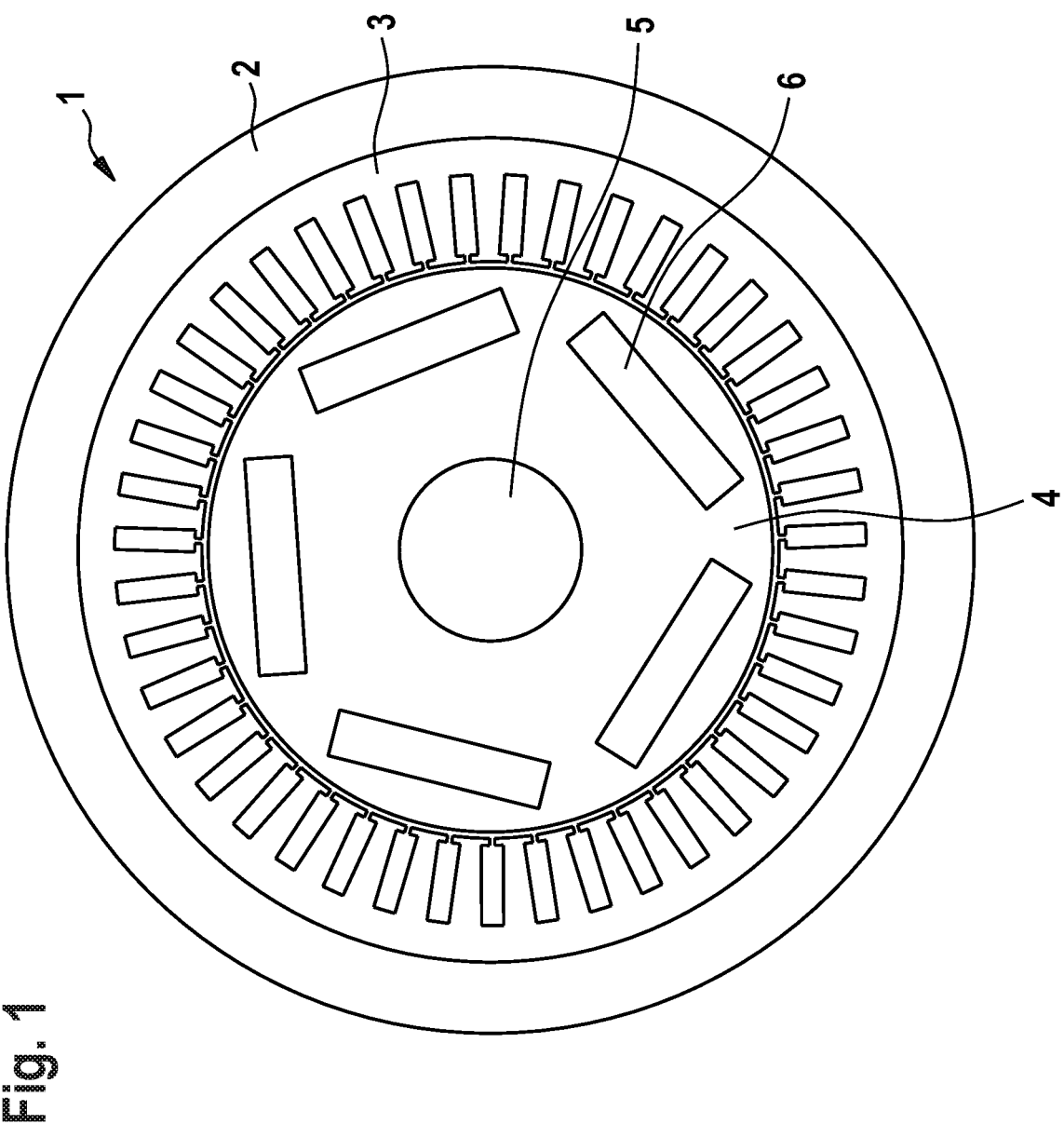

| WO | 2009/015946 A1 | 2/2009 |
| WO | 2010/118792 A1 | 10/2010 |
| WO | 2014/194060 A1 | 12/2014 |

* cited by examiner

STATOR HOUSING FOR AN ELECTRIC MACHINE, ELECTRIC MACHINE FOR A VEHICLE AND VEHICLE

RELATED APPLICATIONS

The present application is based on, and claims priority from, European Application No. 18 209 098.5 filed Nov. 29, 2018, the disclosure of which is hereby incorporated by reference herein in its entirety.

The present invention refers to a stator housing for an electric machine, comprising a plurality of axially extending main channels, wherein pairs of adjacent main channels are connected by deflection channels to form a meandering cooling path for a coolant. Besides, the present invention relates to an electric machine for a vehicle and a vehicle.

When operating an electric machine, electrical losses are proportional to a current injected to stator windings of the electric machine. Due to an electrical resistance of the stator windings, a higher heat is generated with increasing injected current. The heat may lead to a thermal failure of the material in active parts, particularly the stator windings, of the electric machine, when exceeding specific maximum rated temperatures. In order to increase the utilization of the electric machine, it is necessary to dissipate the heat by providing a fluid cooling, e.g. a water cooling, to the electric machine. It is known to integrate the fluid cooling within a stator housing of the electric machine, in which axial main channels and deflections channels that connect pairs of adjacent main channels are provided to form a meandering cooling path.

However, with an increasing number of deflection channels and an increasing volume flow rate of the coolant a cooling efficiency and a pressure drop between a beginning and an end of the cooling path increases. As an undesired result, higher pressure drops require stronger fluid pumps.

Thus, it is an object of the present invention to provide a stator housing with an improved cooling path that is particularly operable with a lower pressure drop.

According to the present invention this object is solved by a stator housing as initially described comprising a plurality of connection channels that connect each pair of adjacent main channels in a fluid conductive manner at an axial position between the deflection channels.

It has been found out that in a conventional meandering cooling path a high-pressure area before a respective deflection channel and the low-pressure area behind the deflection channel emerge due to flow separation of the coolant. By adding the connection channels a pressure equalization between the high-pressure area and the low-pressure area in the pair of adjacent main channels is realized which reduces a pressure drop between the pressure areas significantly. Therein, it has been identified that the effect of reducing the pressure drop is typically larger than an effect that reduces cooling efficiency of the stator housing due to a certain amount of coolant flowing through the connection channel, when comparing the stator housing according to the invention with a corresponding conventional stator housing without connection channels. Advantageously, weaker and particularly smaller fluid pumps can be used with the inventive stator housing due to the improvement of the cooling path with the lower pressure drop.

Typically, the deflection channels may be configured to realize a deflection of the coolant flowing to the cooling path of at least 170°, preferably at least 175°, more preferably at least 179°. Preferably, the main channels extend parallelly in axial direction. Typically, the cooling channels are arranged at a central axial position pair of adjacent main channels. The central position may be between 40% and 60% of the total length of the pair of adjacent main channels. Typically, the cooling path comprises an inlet channel connected to a first main channel with respect to the flow direction of the coolant and/or an outlet channel connected to the last main channel with respect to the flow direction of the coolant. The inlet channel may be connected to the first main channel by means of a further deflection channel and/or the last main channel may be connection to the outlet channel by means of a further deflection channel. A further connection channels may be arranged between the inlet channel and the first main channel and/or a further connection channel may be arranged between the last main channel and outlet channel. The inlet channel and/or the outlet channel may be shaped such that it guides the coolant at least partially in a circumferential direction of the stator housing.

Preferably, the connection channels have a smaller cross-sectional area than the main channels. It has been found out that small connection channels already provide a sufficient equalization between the pressure areas in the adjacent main channels without affecting the cooling efficiency heavily. In detail, the cross-sectional area of each connection channel may be at least two percent, preferably at least five percent, more preferably at least seven percent, and/or at most thirty percent, preferably at most twenty percent, more preferably at most ten percent, of the cross-sectional area of a main channel connected by the connection channels.

Advantageously, the stator housing according to the invention is configured such that at least two percent, preferably at least five percent, more preferably at least ten percent, and/or at most thirty percent, preferably at most twenty percent, more preferably at most fifteen percent, of a mass flow of the coolant flowing through a main channel is bypassed through the connection channel connecting the main channel with its adjacent main channel.

In general, the connection channels may have various cross-sections such as a circular, oval or rectangular shape. According to a very preferred embodiment of the stator housing according to the invention the connection channels have a trapezoid cross-section.

In order to simplify manufacturing of the cooling path, it is preferred that the main channels and the connection channels, and particularly the deflection channels and/or the inlet channel and/or the outlet channel, are formed by a cavity in the stator housing. The respective cavities may be milled into a material forming the stator housing.

Therein, sections of the cavity forming the main channels may be separated by a wall, wherein each connection channel connecting one of the pairs of adjacent main channels may be formed by a groove in the wall. Therein, it is preferred that the sections of the cavity forming the main channels are deeper than the grooves.

The stator housing according to the invention may comprise an inner housing element and an outer housing element, wherein the inner housing element is coaxially arranged inside the outer housing element. Thereby, the stator housing may be simply manufactured in a modular manner.

Therein, the cavity may be formed in one of the housing elements. According to a preferred design the cavity is formed in the inner housing element and closed by the outer housing element. Alternatively, the cavity may be formed in the outer housing element and closed by the inner housing element.

Furthermore, one housing element may comprise a first end shield of the stator housing and one housing element may comprise a second end shield of the stator housing. Preferably, the first end shield is a drive end shield and the second end shield is a non-drive end shield. Preferably, an inlet connected to the inlet cooling path and/or an outlet connected to the outlet cooling path are integrally formed with the outer housing element. Preferably, the inlet and the outlet are arranged at opposing axial positions of the stator housing.

Furthermore, the present invention refers to an electric machine for a vehicle, comprising a stator arranged inside a stator housing according to the invention.

Besides, the present invention refers to a vehicle, comprising an electric machine according to the invention that is configured to drive the vehicle. The vehicle may be a fully electrically driven vehicle or a partially electrically driven vehicle such as a hybrid vehicle.

All statements referring to the inventive stator housing apply analogously to the inventive electric machine and to the inventive vehicle, so that the above-mentioned advantages of the stator housing may be achieved therewith as well.

Figure 2:
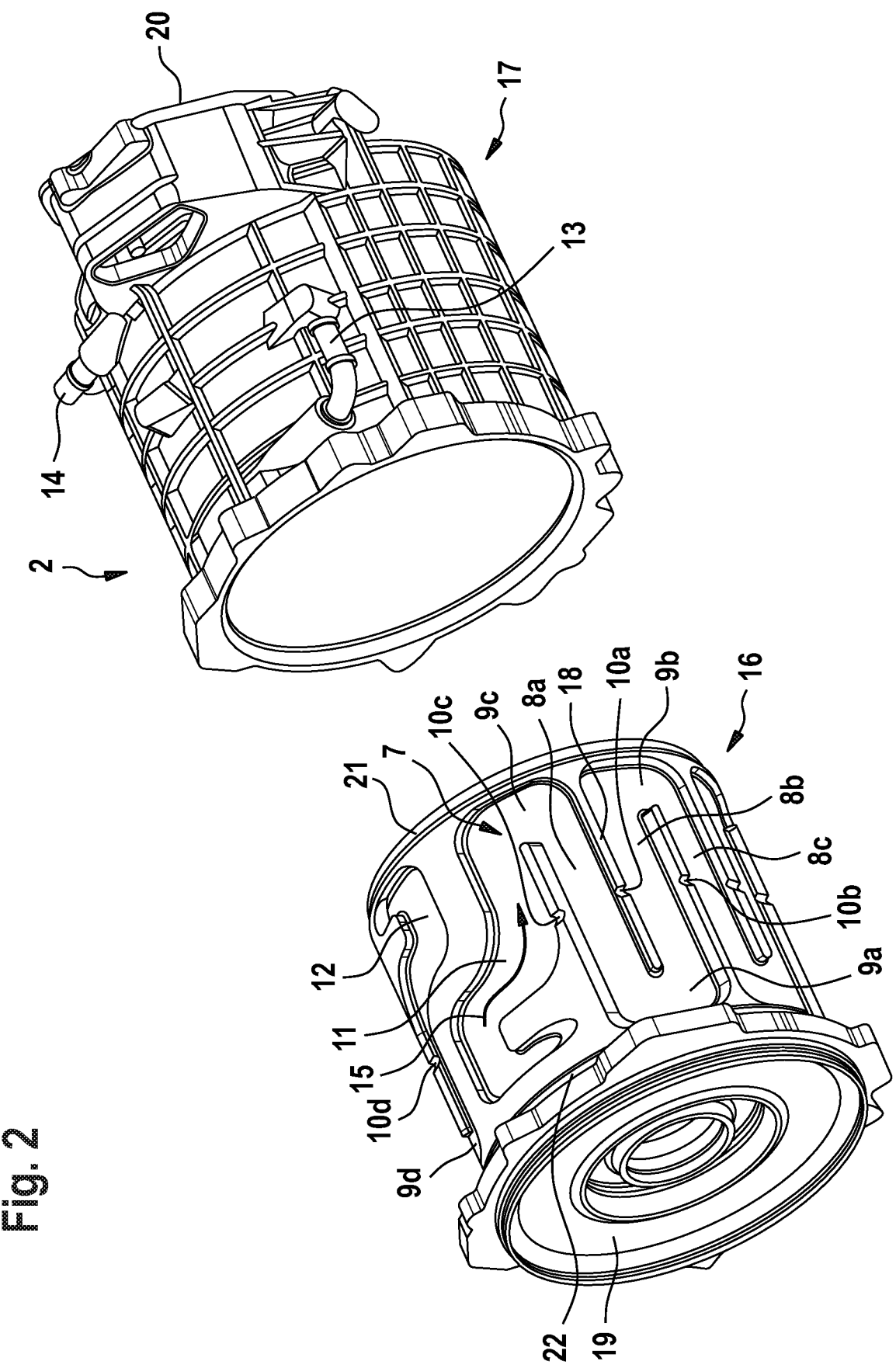
Figure 3:
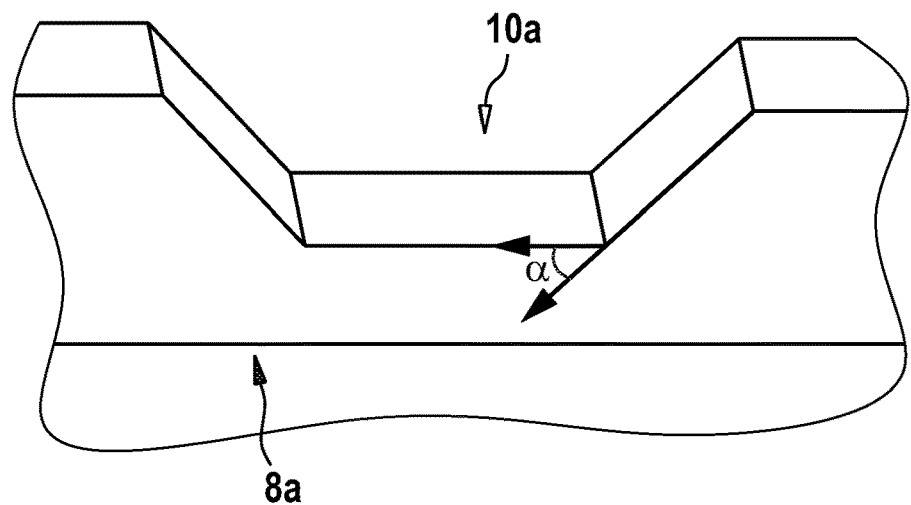
Figure 4:
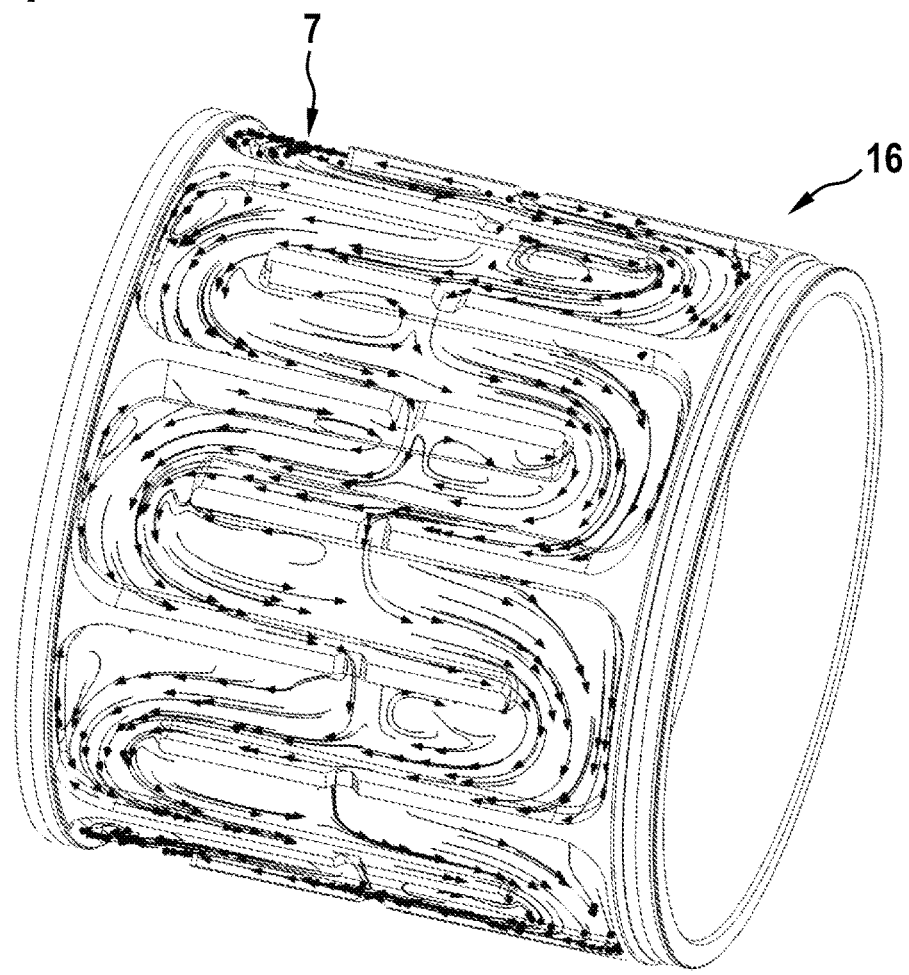
Figure 5:
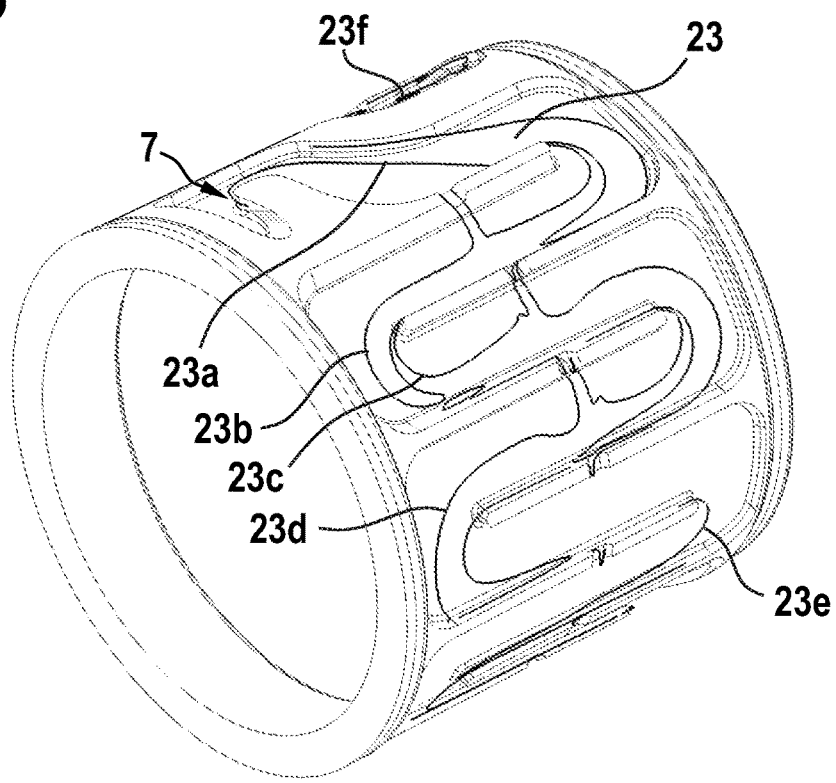
Figure 6:
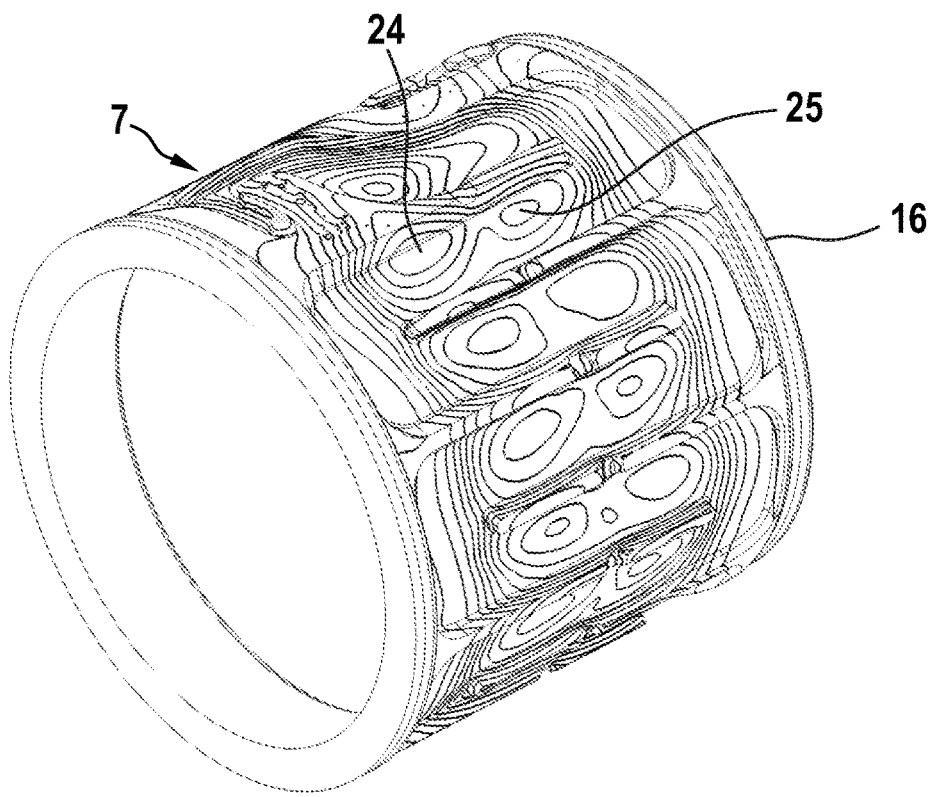
Figure 7:
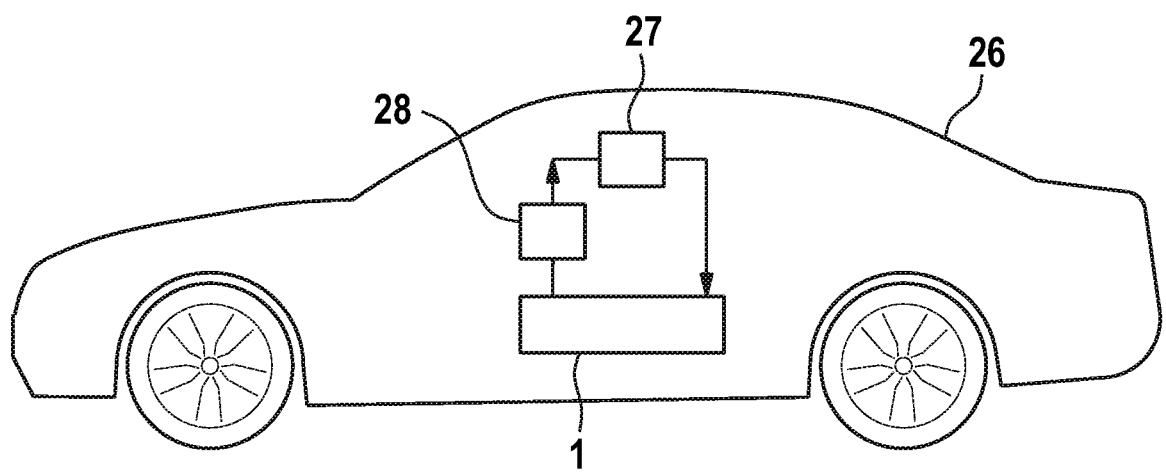

Further details and advantages of the invention are disclosed in the following, wherein reference is made to the schematic drawings showing:

FIG. 1 a principle cross-sectional view of an embodiment of an electric machine according to the invention comprising an embodiment of a stator housing according to the invention;

FIG. 2 an exploded view of the stator housing;

FIG. 3 a perspective view of a connection channel of the stator housing;

FIG. 4 stream lines of a coolant flowing along a cooling path of the stator housing during operation of the electric machine;

FIG. 5 a pressure distribution along the cooling path during operation of the electric machine;

FIG. 6 a temperature distribution of an inner housing element of the stator housing during operation of the electric machine; and FIG. 7 a principle diagram of an embodiment of a vehicle according to the invention.

FIG. 1 is a principle cross-sectional view of an embodiment of an electric machine 1 comprising an embodiment of a stator housing 2, a stator 3 being fixed inside the stator housing 2 by means of a press fit, a rotor 4 being rotatably arranged inside the stator 3 and a shaft 5, which is attached to the rotor 4. Exemplarily, the rotor 4 comprises multiple permanent magnets 6.

FIG. 2 is an exploded view of the stator housing 2, which comprises a cooling path 7 including by a plurality of axially extending main channels 8a to 8c and deflection channels 9a, 9b which connect pairs of the adjacent main channels 8a to 8c such that a coolant flowing through the cooling path 7 is deflected by 180°, when leaving a respective main channel 8a to 8c. Thus, the deflection channels 9a, 9b extend substantially in circumferential direction and are arranged alternatingly on opposing front sides of the stator housing 2. Furthermore, the cooling path 7 comprises connection channels 10a, 10b that connect each pair of main channels 8a to 8c in a fluid conductive manner at a central axial position between the deflection channels 9a, 9b.

Additionally, the cooling path 7 comprises an inlet channel 11 and an outlet channel 12, which differ from the main channels 8a to 8c in that they extend partially in circumferential direction and that they are configured to guide the coolant from an inlet 13 to the first main channel 8a with respect to a flow direction of the coolant (depicted by an arrow 15) or from a last main channel (not visible in FIG. 2) with respect to the flow direction to an outlet 14 of the stator housing 2, respectively. Therein, the inlet channel 11 and the first main channel 8a are connected by a further deflection channel 9c and the last main channel and the outlet channel 12 by a further deflection channel 9d. Besides, a further connection channel 10c is provided between the inlet channel 11 and the first main channel 8a and a further connection channel 10d is provided between the last main channel and the outlet channel 12, wherein axial positions of the further connection channels 10c, 10d correspond to those of the connection channels 10a, 10b.

FIG. 3 is a perspective view of the connection channel 10a, which is representative for the other connection channels 10b, 10c, 10d. The connection channel 10a has the cross-sectional shape of an isosceles trapezoid, whose long parallel side is about 1.95 times as big as its short parallel side. The height of the connection channel 10a is about 60% of the height of the main channel 8a, wherein an angle α being the inside angle between the long parallel side and a leg of the trapezoid is about 44.7°. The cross-sectional area of the connection channel 10a is about 8% of the cross-sectional area of the main channel 8a that is connected via a connection channel 10a to the main channel 8b. This results in that about 12% of the mass flow of the coolant flowing through the main channel 8a is bypassed through the connection channel 10a without passing the deflection channel 9a.

Again, with reference to FIG. 2 the stator housing comprises an inner housing element 16 and an outer housing element 17. The inner housing element 16 is coaxially arranged inside the outer housing element 17. Accordingly, the main channels 8a to 8c, the deflection channels 9a to 9d, the connection channels 10a to 10d, the inlet channel 11 and the outlet channel 12 are formed by a cavity milled into a cylindrical structure of the inner housing element 16. Thus, the pairs of adjacent main channels 8a to 8c are separated by walls 18, wherein the connection channels 10a to 10d are formed by respective grooves in the walls 18. When being arranged inside the outer housing element 17, the cavity is closed by an inner cylindrical structure of the outer housing element 17.

Furthermore, the inner housing element 16 comprises a first end shield 19 being a drive end (DE) shield of the electric machine 1 and the outer housing element 17 comprises a second end shield 20 being the non-drive end (NDE) shield of the electric machine. Additionally, on both face sides of the inner housing element 16 sealing 21, 22 are arranged that seal the inner housing element 16 against the outer housing element 17.

FIG. 4 shows stream lines of the coolant flowing along the cooling path 7 during operation of the electric machine 1. In comparison to conventional stator housings without connection channels a flow separation and coolant circulation after having passed a deflection channel, is significantly reduced by an equalizing effect of the connection channels.

FIG. 5 shows a pressure distribution along the cooling path 7 of the stator housing 2 during operation of the electric machine 1 represented by isobars 23a to 23f. The coolant enters the cooling path 7 with a maximum pressure drop of exemplarily 3.5 kPa inside a maximum pressure area 23. Therein, the isobars 23a to 23f denote approximately the following pressure drops: 23a —3.27 kPa; 23b—3.03 kPa; 23c—2.80 kPa; 23d—2.57 kPa; 23e—2.33 kPa; 23f—0.00 kPa.

It has been determined that, in comparison to the conventional stator housing, the pressure drop is lowered by 37.53% for an inlet coolant temperature of 25° C. and lowered by 42.89% for an inlet coolant temperature of 65° C. when applying a respective volume flow rate of 10 l·min$^{-1}$.

FIG. 6 shows a temperature distribution of the inner housing element 16 during operation of the electric machine 1 represented by isotherms. As depicted by hotspot areas 24, 25 there exist local temperature maxima before and behind a respective connection channel 10*a* to 10*d* of each main channel 8*a* to 8*c*, which are warmer than a single hotspot area in the conventional electric machine without connection channels. However, at a critical point (inlet temperature of 70° C., volume flow rate of 6 l·min$^{-1}$) the absolute temperature increase in comparison to conventional electric machine without connection channels is significantly lower than the pressure drop reduction realized by applying the connection channels 10*a* to 10*d*, as denoted in the following table:

|  | Without connection channels | With connection channels | Heat increase |
|---|---|---|---|
| DE housing |  |  |  |
| max. temp. | 361.65 K (88.50° C.) | 362.96 K (89.81° C.) | 0.36% |
| avg. temp. | 350.15 K (77.00° C.) | 351.63 K (78.48° C.) | 0.42% |
| NDE housing |  |  |  |
| max. temp. | 351.15 K (78.00° C.) | 354.56 K (81.41° C.) | 0.97% |
| avg. temp. | 346.65 K (73.50° C.) | 348.34 K (75.19° C.) | 0.49% |
| Press fit |  |  |  |
| max. temp. | 361.65 K (88.50° C.) | 363.00 K (89.85° C.) | 0.37% |
| avg. temp. | 356.95 K (83.80° C.) | 358.55 K (85.40° C.) | 0.45% |
| Coolant wall |  |  |  |
| max. temp. | 360.65 K (87.50° C.) | 361.99 K (88.84° C.) | 0.37% |
| avg. temp. | 352.65 K (79.50° C.) | 354.26 K (81.11° C.) | 0.46% |

Consequently, by providing the connection channels 10*a* to 10*d* a significant reduction of the pressure drop across the cooling path 7 is realized at cost of only a very few raise of maximum and average temperatures at several interesting point of the electric machine 1.

FIG. 7 is a principle diagram of an embodiment of a vehicle 26, comprising an electric machine 1 according to one of the aforementioned embodiments, which is supplied by a pump 27 via a heat exchanger 28 for cooling the electric machine 1.

The invention claimed is:

1. A stator housing for an electric machine, comprising:
   a plurality of axially extending main channels extending along an axial direction of the stator housing, and including
      a first axially extending main channel,
      a second axially extending main channel, and
      a third axially extending main channel apart from the first axially extending main channel and the second axially extending main channel to form a first wall and a second wall therebetween;
   a plurality of deflection channels alternatively arranged on two sides of the plurality of axially extending main channels in the axial direction of the stator housing, and including
      a first deflection channel connecting the first axially extending main channel and the third axially extending main channel at one of two sides of the plurality of axially extending main channels, and
      a second deflection channel connecting the second axially extending main channel and the third axially extending main channel at another of two sides of the plurality of axially extending main channels opposite to the one of two sides thereof,
      the plurality of axially extending main channels and the plurality of deflection channels forming a S-shaped path for a coolant; and
   a plurality of connection channels arranged between the plurality of deflection channels in the axial direction of the stator housing, and including
      a first connection channel extending through the first wall between the first axially extending main channel and the third axially extending main channel to connect the first axially extending main channel and the third axially extending main channel in a fluid conductive manner, and
      a second connection channel extending through the second wall between the second axially extending main channel and the third axially extending main channel to connect the second axially extending main channel and the third axially extending main channel in the fluid conductive manner.

2. A stator housing according to claim 1, wherein each of the plurality of connection channels has a cross-sectional area smaller than that of each of the plurality of axially extending main channels.

3. A stator housing according to claim 2, wherein the cross-sectional area of each of the plurality of connection channels is in a range of two percent to thirty percent of the cross-sectional area of each of the plurality of axially extending main channels.

4. A stator housing according to claim 1, wherein the plurality of axially extending main channels and the plurality of connection channels are formed by a cavity in the stator housing.

5. A stator housing according to claim 4, wherein sections of the cavity forming the plurality of axially extending main channels are separated by walls, respectively, and
   the plurality of connection channels, each connecting two of the plurality of axially extending main channels adjacent to each other, is formed as grooves in the walls, respectively.

6. A stator housing according to claim 4, further comprising an inner housing element and an outer housing element, wherein the inner housing element is coaxially arranged inside the outer housing element.

7. A stator housing according to claim 6, wherein the cavity is formed in one of the inner and outer housing elements.

8. A stator housing according to claim 7, wherein the cavity is formed in the inner housing element and closed by the outer housing element, or
   the cavity is formed in the outer housing element and closed by the inner housing element.

9. A stator housing according to claim 6, wherein one of the inner and outer housing elements includes a first end shield of the stator housing and another of the inner and outer housing elements includes a second end shield of the stator housing.

10. An electric machine for a vehicle, comprising:
    the stator housing according to claim 1; and
    a stator arranged inside the stator housing.

11. A vehicle, comprising:
    the electric machine according to claim 10 that is configured to drive the vehicle.

12. A stator housing according to claim 1, wherein the first axially extending main channel and the second axially extending main channel are configured to flow the coolant in one direction and the third axially extending main channel is configured to flow the coolant in another direction opposite to the one direction.

13. A stator housing according to claim 1, wherein a mass flow of the coolant bypassed through one of the plurality of connection channels connecting one and another of the plurality of axially extending main channels adjacent to each other is in a range of two percent to thirty percent of the mass flow of the coolant flowing through the one of the plurality of axially extending main channels.

14. A stator housing according to claim 1, wherein each of the plurality of connection channels has a trapezoid cross-section.

15. A stator housing for an electric machine, comprising:
   a plurality of axially extending main channels;
   a plurality of deflection channels, each of the plurality of deflection channels connecting two of the plurality of axially extending main channels adjacent to each other to form a meandering cooling path for a coolant; and
   a plurality of connection channels, each of the plurality of connection channels connecting two of the plurality of axially extending main channels adjacent to each other in a fluid conductive manner at a position between two of the plurality of deflection channels in an axial direction,
   wherein the plurality of axially extending main channels and the plurality of connection channels are formed by a cavity in the stator housing,
   sections of the cavity forming the plurality of axially extending main channels are separated by walls, respectively,
   the plurality of connection channels, each connecting two of the plurality of axially extending main channels adjacent to each other, is formed as grooves in the walls, respectively, and
   the sections of the cavity forming the plurality of axially extending main channels are deeper than the grooves, respectively.

* * * * *